3,792,171
MANUFACTURE OF CHEESE CURD
Lawrence L. Little, 1600 Renoir Lane,
Creve Coeur, Mo. 63141
No Drawing. Continuation-in-part of abandoned application Ser. No. 79,363, Oct. 8, 1970. This application Nov. 13, 1972, Ser. No. 306,161
Int. Cl. A23c *19/02*
U.S. Cl. 426—38                                    26 Claims

ABSTRACT OF THE DISCLOSURE

Milk is acidified by mixing solid, soluble acid particles therewith that have been coated with a material that will disperse or dissolve in the liquid milk media at a rate to delay dissolution of the acid particles and effect relatively slow and uniform acidification. In another embodiment such particles are added to milk prior to syneresis of the protein content of the milk and prior to any substantial dissolution of the particles so that coated particles are entrapped in the resultant curd and such curd is further acidified after its formation.

CROSS-REFERENCE

This application is a continuation-in-part of my patent application "Manufacture of Cheese Curd," Ser. No. 79,363, filed Oct. 8, 1970 now abandoned.

BACKGROUND

In the manufacture of cheese curd, it is conventional practice to inoculate milk with a bacteria culture which produces lactic acid to acidify the milk. When such milk reaches an acidity at or near its isoelectric point, agglomeration of the casein occurs to form a curd and effect a separation of the whey. Although when properly regulated and controlled "cultured" cheese curd, such as is produced in the manufacture of cottage cheese, is of high quality, the difficulties and disadvantages encountered through the utilization of such a system are many.

For example, in the conventional process for making cottage cheese, the milk is usually held at temperatures and for times which tend to promote deleterious growth. Milk is usually "set" at temperatures of 70–75° F. for periods of 12 to 18 hours or alternatively may be held at about 90° F. for as long as 4 hours. During such setting period and in subsequent cooking before the whey reaches a temperature disposed to stop bacterial growth, a substantial multiplication of contaminating bacteria that have survived pasteurization may occur. Such contaminating bacterial growth contribute to the presence of spoilage organisms that bring about the notoriously short life of cottage cheese.

For instance, in the production of cottage cheese, undesirable bacteria species which often survive pasteurization interfere with the culture process and impart poor keeping qualities to the finished cheese. Also, the problems of phage have become so widespread and difficult to control that developing acidity by culturing is becoming increasingly hazardous and difficult. The word "phage" is applied to viruses which attack and destroy bacteria. These viruses often infect cottage cheese bacterial starter cultures and destroy the desirable acid and flavor producing bacteria. There are very few cottage cheese processors that do not have to dispose of several batches of milk each year because of phage. Such a loss not only involves a loss of material and labor but also interrupts the manufacturer's ability to continuously supply his customers.

Additionally, it is difficult to accurately develop the desired acidity by the culturing process. To obtain the desired optimum quality of cottage cheese curd, it is very important to maintain exact control over the hydrogen potential of the milk at the time the curd is being cooked. The desired acidity, as measured by pH for cutting and cooking is within the range of 4.60 to 4.80. Since the lactic acid producing organisms are in a logarithmic phase of their growth at the time the milk reaches this pH, they are producing acid very rapidly; consequently, the cheesemaker must keep a close watch in order to cut the curd while it is within a critical pH range. The lactic acid producing organisms continue to grow and produce acid after the curd is cut so that if the curd is cut at a pH of about 4.8, the acidity is 4.6 or lower by the time cooking effects a temperature where lactic acid production stops. Consequently, the time for cutting and cooking must be experttly gaged to avoid overacidity of the cooked product which results in excessive shattering of the cubes giving an unsightly appearance accompanied by loss of curd and low yield. A slight miscalculation in the time for cutting and cooking contributes to a hard rubbery and dry product (too acid) or a soft fragile mushy product (high pH).

An obvious expedient in circumventing the difficulties encountered by the utilization of bacteria cultures in the manufacture of cheese curd is the direct addition of acid to milk in quantities needed to effect the desired acidity for casein coagulation. However, cheese curd, such as cottage cheese curd, to be marketable must be of a gelled texture that is obtained only by the relatively slow and uniform coagulation which occurs at an acidity which is at or near the isoelectric point of the milk. When concentrated acids are added directly to milk to increase its acidity, the localized area of the milk where the acid is introduced acquires an excessive acidity before a homogenous mixture of milk and acid can be obtained. Premature casein agglomeration occurs in the localized areas and uneven precipitation occurs generally. The texture of the resultant loose precipitant is unsatisfactory usually being hard, dry, and uneven in size as well as being generally unpalatable.

Casein agglomeration in milk effected by the slow addition of concentrated acids accompanied by agitation to avoid premature precipitation requires prohibitive time and is difficult to control. Agglomeration of casein effected by the addition of acid of a dilution to avoid premature casein precipitation results in a thin, watery, and undesirable product.

It is known that when concentrated acid is added to refrigerated milk the casein does not readily agglomerate. Culture acidification of milk is generally at 70° F. or higher since casein does not readily coagulate at lower temperatures. This property of milk is exploited commercially by processes such as that taught by U.S. Pat. 3,089,-776, to Carl Ernstrom.

In the Ernstrom process, milk (usually skim milk) is pasteurized and cooled to a temperature of about 40° F. Concentrated hydrochloric acid is then added to bring the pH down to about 4.60. The milk does not coagulate due to the low temperature. The refrigerated acid-milk solution is agitated or stirred to effect a uniform mixture and is then warmed in a quiescent state to a temperature of about 75° F. Agitation of the milk during warming is avoided. After the milk is warmed an agglomeration of the casein takes place, the curd is cut and cooked in the usual manner. The curd thus obtained is of high quality; however, the step of warming the milk in a quiescent state is difficult. Presently available apparatus for processing dairy products include heat exchangers and large storage vats so that refrigerating the milk while introducing it into a storage vat for acidification does not constitute a problem. However, heating reasonably large quantities of milk in a quiescent state for the commercial application of the Ernstrom process is not practical in conventional storage vats. External heating elements or heating element inserted into the milk are prohibitively slow under such circumstances. It is not possible to use commercial heat exchangers wherein the milk is caused to flow over hot heat exchanger plates since the acidified milk must be heated in a quiescent state.

Effective commercial utilization of the Ernstrom system requires special automated apparatus wherein refrigerated acidified milk is caused to rise slowly in vertically positioned tubes that are surrounded with circulating heated water disposed to cause the temperature of the milk in the tubes to rise uniformly and the casein to coagulate. The curd is cut as it extends from the top of the tubes. Such automated equipment is expensive and renders much of the conventional equipment obsolete.

Additionally, to get curd of sufficient body to stand up in the vertical tubes, it is necessary to substantially increase the milk solids not fat content of the milk by the addition of skim milk powder or concentrated skim milk.

Another known method for making direct-acid additions to milk while circumventing the problems of uneven casein coagulation and dilution is through the use of acidogens such as glucono delta-lactone. These materials constitute neutral substances which will react with water to form an acid capable of coagulating casein. By thoroughly mixing the acidogen with milk acidification occurs substantially "in situ" as in culturing so that curd formation is substantially uniform. This process is fully described in U.S. Pat. 2,982,654 to Earl G. Hammond.

Although the use of acidogen provides a reasonable means for effecting the direct acidification of milk to obtain commercially useful cheese curd, it has not proved to be economically feasible or even competitive with the conventional culturing techniques. The reason for this is that the buffering system of milk resists acidification so that a substantial quantity of acid or acidogen is required to lower the pH of milk to where syneresis will take place. For example, as much as 18 grams of acidogen may be required to lower the pH of 2000 grams of skim milk from about 6.70 to about 4.7. Increased costs of acidogen over that of culturing or concentrated acids render the use of acidogens alone impractical.

Recent attempts in the milk industry to by-pass conventional culturing techniques have been to make concentrated acid additions to milk in amounts that fall just short of effecting curd formation. By proper agitation and/or temperature control, it is possible to acidify with concentrated acids without any premature curdling to a pH just above that at which syneresis will take place. Acidogens such as glucono deltalactone (GDL) are then added in amounts to raise the acidity of the milk to its isoelectric point effecting syneresis and curd formation. Since most of the acidification has been accomplished by the utilization of relatively inexpensive concentrated acids, a substantially reduced quantity of acidogen is required.

A particularly successful practice has been by a combination of the process set forth in my U.S. patent application Ser. No. 734,878, "Direct Acid Cheese Curd" and that of the aforementioned Hammond patent. In my process the milk is acidified at refrigerated temperatures (below about 50° F.) then is warmed to ambient temperatures and set (curd formed) by ading an excess of an enzyme such as rennin. Basically the process of my application as it is utilized commercially, as follows:

(1) With the milk at a temperature below 50° F. (about 40° F.), acidify to a pH of about 4.85–5.20, using a concentrated acid;
(2) Warm the milk to ambient temperature (about 50° F.–80° F.);
(3) Add enzyme (about 1–100 cc. per 1000 lb. of milk) and hold the milk quiescent until coagulated firm enough to cut;
(4) Cut the curd. This is usually done at a pH of 4.85–5.20 (in our preferred procedure, we cut the curd at a pH of 4.95–5.05);
(5) After cutting the curd, make a second addition of acid. This should be in an amount sufficient to reduce the pH of the whey at the end of the cooking process to 4.30–4.50. Also, it is desired to reduce the pH of the finished cottage cheese to 4.85 or below. However, the absorption of acid from the whey into the cubes of curd is very slight and in actual practice it rarely drops as low as 4.85. When the pH of the finished cottage cheese is 4.95 or above, the cheese has a tendency to develop off-flavors during storage. This is a very serious difficulty and it is mandatory that the pH be kept below this point if a satisfactory product is going to be produced. Also, when the pH is 4.85 or below, consistently better yields are attained. At present no means have been found to cause the curd to absorb more of the second addition of acid;
(6) Cook the cubes (while in the whey) at a temperature of from about 100° F. to 150° F.;
(7) Separate cubes (curd) from the whey; and
(8) Wash the cubes with water.

The above steps can be modified by adding acidogens such as GDL at Step No. 3 to assure acid coagulation but more importantly to improve the pH or acid characteristics of the resultant curd (i.e., to 4.85 or below).

One of the disadvantages of the above direct-acidification process is that it is not possible to reduce the pH of the milk as low as is desired without encountering premature coagulation. It is well known that a cheese curd that exhibits a pH of about 4.95 or greater has poor keeping qualities or a tendency to develop off flavors during storage. Acidogens added to Step 3 of my process in the manner described above provides at least some acid development after the milk has set or curd has formed thus assuring a lower pH in the developed curd and a product with good keeping qualities having no tendency to develop off-flavor flavors during storage.

The addition of acidogens such as GDL causes no immediate reduction in the pH of milk because it is neutral and only forms acid as it hydrolyzes slowly in solution to gluconic acid. There is only a very slight amount of hydrolysis of acidogens such as GDL during the setting period but the rate of hydrolysis increases rapidly as the temperature is raised during cooking. Consequently there is a highly desired acid development within the curd at this critical point of the process.

A typical profile of the pH of the milk and curd during processing in the manner set forth above is as follows:

(a) With the milk at about 40° F., acidify with 75 percent phosphoric acid at the rate of 3.75 cc. per 100 grams solids in the milk.
(b) Warm the milk to about 70° F. At this point the pH will be approximately 5.05.
(c) Add GDL at the rate of 2 grams per 100 grams solids in the milk. Then add an enzyme solution (cottage cheese coagulator) at the rate of 330 cc. per 100 gallons of milk and agitate thoroughly. At this point, the pH is normally 5.00–5.05.
(d) Allow the milk to set in a quiescent state for 90 minutes, then cut the coagulated milk into cubes using ½-inch curd knives. At this point, the pH would normally be 4.90–4.95.
(e) Allow the cheese to set for 15 minutes, then add 75 percent phosphoric acid at the rate of 0.50 cc. per 100 grams of solids in the milk.
(f) Start heating the cheese and after about 10 minutes stir very carefully. Continue heating and stirring the cheese until it reaches a temperature of 125° F.
(g) Stop the heating and drain the whey from the curd. The pH of the whey at this point should be about 4.40–4.50.

(h) Rinse the cheese by filling the vat about ¾ full of chilled water that has been acidified to a pH of 6.00 or below and chlorinated with 10 parts per million of available chlorine. Allow the water to remain on the curd about 15 minutes; then drain the water from the curd. Wash the curd a second time by repeating the process just outlined.

(i) Drain off the last rinse water, then cream and package the dry curd. The pH of the dry curd at this point should be 4.75 or below.

The drawbacks encountered by using acidogens such as GDL in the manner described above continue to relate to costs since the amount of acidogen required remains relatively high denying the process a true competitive position relative to conventional culturing. Acidogens hydrolyzed slower than is desired causing a lag in acid development. Hydrolysis is only about 85 percent complete so about 15 percent of the acidogen does not function and is lost. The gluconic acid produced has a high equivalent molecular weight compared to other organic acids. For example, gluconic acid's equivalent molecular weight of 196 compares to 58 for fumaric acid. The cost of GDL is about two to three times the price of fumaric acid. Thus, on a use basis the cost of using GDL would be about ten times the cost of using fumaric acid.

Additionally because of the slow rate of GDL hydrolysis, it is difficult to accurately control the pH profile of the milk from the time the curd is cut until the cooking process is completed.

THE INVENTION

I have now found a means whereby solid particles or crystals of milk (water) soluble organic acids may be effectively substituted for acidogens. I have discovered that the solid acid particles or crystals can be coated with a wide variety of materials that will damper or retard their dissolution so that their rate of acidification of the liquid media is gradual and similar to that of the acidogens. By using my process it is possible to control the rate of acidification and thus eliminate the disadvantages of the slower than desired dissolution properties of the acidogens. Since I use conventional organic acids, my process is competitive with culturing and possesses no disadvantages relative to the high molecular weight of the developed acids.

My process may be used for the direct acidification of milk with or without the use of adjuncts such as colloid-forming stabilizers, emulsifiers, flavoring agents, etc. Since the concentrated solid organic acids employed may be of a commercially available variety, the economics of my process are much more competitive with the culturing process than is the use of acidogens. However, the use of coated or dampered solid acids as a replacement for acidogens in "finishing off" acidification with other acids is also significantly advantageous. The reason for this, of course, is that liquid mineral acids such as hydrochloric or phosphoric acid are more readily available at substantially lower costs than the organic acids. Thus, the combined use of mineral acids and the solid coated acids of the present invention are significant advantages over the prior art culturing or acidogen procedures.

My coated acid particles can also be used as a substitute for acidogens as additions to milk prior to coagulation effected by other means (i.e., acid-enzyme action) so as to be entrapped in the curd and effect subsequent acidification thereof.

For the purposes of the present invention, any acid available in solid particulate form, including lactic acid crystals or granules, acetic acid crystals or granules, or phosphoric acid crystals or granules, may be employed since the dampering effect or speed at which such acid will go into solution in the media may be regulated by controlling the characteristics of the coating. However, it was discovered that the low solubility acids could be coated with various substances that would drastically alter their solubility characteristics. For example: fumaric acid may be coated with corn oil by taking nine parts of fumaric acid plus one part corn oil and mixing thoroughly so that all particles of fumaric acid are covered with a continuous film of corn oil. This corn oil-coated fumaric acid can then be added to the milk at a temperature of about 70° F. and a pH of from 4.90 to 5.50, agitated vigorously to disperse it thoroughly and uniformly throughout the milk, without any significant change in the pH of the milk, or any flaking, precipitation, or coagulation of the casein in the milk. Furthermore, the milk containing the dispersed corn oil-coated fumaric acid may be held at this temperature for up to two hours or more without significant reduction in the pH of the milk. However, when the temperature of the milk is raised even though very slowly, the corn oil-coated fumaric acid begins to dissolve in the milk and the pH starts decreasing. At a temperature of about 110° F., the fumaric acid is essentially all dissolved, and the pH of the milk is reduced accordingly.

I found that the other two low solubility food acids (adipic acid and succinic acid) can be dampered in the same way as fumaric acid. Although adipic acid is over three times as soluble as fumaric acid, and succinic acid is over ten times as soluble as fumaric acid, their solubility is still of a very low order compared to the three high solubility food acids. Their response to the various dampering coatings are all very similar.

Although the low solubility organic acids are preferred, I have also had some success with some relatively high solubility crystalline acids that are more readily available than fumaric adipic, or succinic acids. These are tartaric, citric, and malic acids.

The preferred acids of the present invention can be classified into two distinct groups, as follows:

|  | Grams of acid/100 grams of water | |
|---|---|---|
|  | 77° F. | 212° F. |
| High Solubility: | | |
| Tartaric acid | 147 | 343 |
| Tartaric acid | 147 | 343 |
| Citric acid | 184 | 525 |
| Malic acid | 139 | (a) |
| Low Solubility: | | |
| Fumaric acid | 0.6 | 10.0 |
| Adipic acid | 1.9 | 83.0 |
| Succinic acid | 7.1 | 21.0 | a Extremely soluble.

It was discovered that a great many materials may be used to coat the solid acid particles, thereby giving greater flexibility to the rate and amount of "dampering" that can be applied to a particular acid. Also, it was discovered that any coating can be easily modified to lessen the dampering effect by blending the coated acid with a small amount of inactive powdered diluent.

We have had particular success in utilizing animal or plant oils or fats, monoglycerides of fatty acids and fatty acids. Such materials do not dissolve in an aqueous media such as milk but do disperse at a relatively controllable rate. Additionally, such materials have a tendency to soften or become less viscous upon heating so as to more rapidly disperse. Thus, the rate of solubility or dampering effect may be controlled by both the materials employed and the heating steps under which processing is effected.

The following list of materials are those we have found to be particularly useful when employed in conjunction with the method of the present invention.

Coating materials

1. Oils and fats.—This category can be further described as consisting primarily of triglycerides (triesters of glycerol and fatty acid).

This group includes both synthetic and natural triglycerides, and the natural triglycerides includes both vegetable and animal products.

(a) Examples of vegetable fats and oils include:

Safflower oil, corn oil, soybean oil, coconut oil. They may be unhydrogenated, partially hydrogenated, or completely hydrogenated.

(b) Examples of animal fats and oils include:

Lard, tallow, butterfat, and neatsfoot oil. They may be unhydrogenated, partially hydrogenated, or completely hydrogenated.

The effectiveness of the various oils and fats vary according to their chemical composition and physical properties, in approximate accordance with these general rules:

(a) The effectiveness decreases as the melting point decreases, and increases as the melting point increases.
(b) The effectiveness decreases as the iodine value (unsaturation) increases, and increases as the iodine value (unsaturation) decreases.

2. Monoglycerides of fatty acids.—This category can be further described as consisting primarily of monoglycerides of fatty acids having a chain length of 10 carbon atoms or more. It may contain smaller amounts of diglycerides, triglycerides, fatty acids, glycerol, and other compounds.

(a) Examples of effective monoglycerides include:

glyceryl monostearate, minimum 90% monoglyceride
glyceryl monooleate, minimum 90% monoglyceride
glyceryl mono safflower oil, minimum 90% monoglyceride
glyceryl mono lard, minimum 90% monoglyceride
glyceryl mono tallow, minimum 90% monoglyceride.

The effectiveness of the various monoglycerides decreases as the percent monoglyceride decreases; decreases as the melting point decreases; and decreases as the iodine value (unsaturation) increases.

Their effectiveness increases as the percent monoglyceride increases; as the melting point increases, and as the iodine value (unsaturation) decreases.

3. Fatty acids.—Further identified as an organic acid containing 10 or more carbon atoms, having the generic formula $C_nH_{2n}O_2$. Some occur as glycerol esters in natural fats.

(a) Examples of effective fatty acids: Stearic acid, oleic acid, palmitic acid, linoleic acid.

4. Miscellaneous substances capable of forming temporary hydrophobic coatings on the acid particles are.— Waxes, paraffin, and higher hydrocarbons having the generic formula $C_nH_{2n+2}$, etc.

Particle size although not critical has a very pronounced influence on the relative ease or difficulty in dampering an acid by coating it with a film of water-insoluble hydrocarbon. The larger the particle is, the easier it is to coat it so as to effectively damper its solubility characteristics, and the smaller the particle, the more difficult it is to impart an effective damper coating to it.

For the sake of clarity in this discussion, we would classify the particle size of fumaric acids as follows:

Coarse—98% of the acid will pass through a 50 mesh screen, but 98% of it will be retained on a 100 mesh screen.

Fine—98% of the acid will pass through a 100 mesh screen, but 98% of it will be retained on a 200 mesh screen.

Extra Fine—98% of the acid will pass through a 200 mesh screen.

A "coarse" particle size type of fumaric acid can be effectively dampered very easily, with a great variety of coating materials.

A "fine" particle size type of fumaric acid is much more difficult to damper effectively, and the variety of coating materials is much more limited.

An "extra fine" particle size type of fumaric acid is extremely difficult to damper effectively, and only the most hydrophobic and water-immiscible coating materials are effective.

Obviously, as the particle size of the acid is decreased to a certain range for any given acid, it becomes impossible to damper it by the coating technique. This critical range is different for each acid, and is determined primarily by the solubility of the acid, but is influenced also to some extent by the "strength" or ionization constant of the acid. The minimum particle size that can be effectively dampered by the coating technique increases for the six solid food grade acids in the following order: Fumaric, adipic, succinic, malic, tartaric, citric. The solubility of malic, tartaric, and citric acids are all so high that the minimum particle size for effective dampering would be essentially the same for all three of them. The exact critical minimum particle size that can be effectively dampered is not known for any of the acids. However, for the least soluble (fumaric acid) a 200 mesh size is very closely approaching this minimum particle size. For the most soluble (citric acid) a 50 mesh size is very closely approaching this minimum particle size.

The method of coating may, of course, be any commercial coating procedure or any other procedure that will effect an essentially uniform coating on the acid crystals. For example, we may introduce the crystals into a rotating drum coater with 10 percent by weight of any of the fats, oils, monoglycerides, or fatty acids described above and tumble the mass until the particles have been appropriately coated. The temperature may be raised during coating to decrease the viscosity of the coating material and lowered during coating in order to obtain stable coated particles. Other methods of coating may include spray coating in a fluidized bed, or mixing the acid with the melted coating in a conventional mixer or blender.

In a variation of my process, buffered acid particles or crystals are entrapped in cheese curd without the necessity of refrigeration. In this procedure milk is preferably acidified to a pH of about 5.10–5.30 at ambient temperatures without coagulation, i.e., the formation of flaking or precipitation of protein. Dampered acids are then added in sufficient quantity to develop the desired pH profile without any immediate signicant reduction in the pH. Enzymes are added to the milk after the addition of the dampered acids in quantities to effect casein coagulation. Preferably the milk is allowed to set in a quiescent state after the enzyme addition until coagulation occurs.

This procedure provides some significant advantages in that many dairies do not have sufficient refrigeration capacity or plate cooling capacity to cool the milk to 40° F. Cooling the milk to 40° F. and subsequently warming to 70° F. after acidification is in itself a significant expense. Warming milk in the cheese vat from 40° to 70° F. is very slow, and generally requires approximately from one to two hours time. Time saving is one important advantage of direct acidification process. Plate heat exchangers can cut the warming time to a minimum of fifteen to twenty minutes, but requires a very substantial investment in heat exchange equipment and storage vats.

The method of the present invention is clearly applicable to obtaining a cheese curd from any milk base, particularly skim milk and reconstituted skim milk. However, the term "milk" as used in the present specification and claims is generic and includes any milk from mammals having a casein content and includes medium and high butterfat milk or cream. For example, the present method may be utilized for obtaining a cheese curd from mixtures of milk and cream containing up to 20 percent butterfat.

Where direct acid additions are made prior to the addition of the dampered acid crystals or granules such as where the dampered acids are used to "finish off" acidification such direct acids may consist of any food grade acids. For example, the direct acids may consist of hydrochloric acid or any of the dampered acids recited above (uncoated).

The following specific examples (Examples 1 through 26) illustrate the practice of the present invention as it applies to the process of the subsequent acidification of cheese curd as follows:

(1) Skim milk is acidified at about 40° F. with 75 percent phosphoric acid at the rate of about 3.75 cc. per 100 grams solids in the milk.

(2) The milk is then warmed to about 70° F. At this point the pH is approximately 5.05.

(3) In conventional "finishing off" processes acidogens such as GDL are added at this point for the development of acid in the curd subsequent to coagulation. At this point the pH is normally 5.00–5.05 and is not immediately affected by the GDL addition. In the examples (below) dampered acids are substituted for the acidogens. Also, an enzyme solution (cottage cheese coagulation) is added at this point at a rate of about 330 cc. per 100 gallons of milk.

(4) The milk is then allowed to set in a quiescent state for about 30 to 90 minutes while the curd forms. At this point the pH is normally (using GDL in place of dampered acids) about 4.90–4.95 (pH when set). The curd is then washed with water and cut into one-half inch cubes.

(5) After setting for fifteen minutes additional 75 percent phosphoric acid is added (to the whey-curd mixture) at the rate of 0.50 cc. per 100 gallons of solids in the milk.

(6) The whey-curd mixture is then heated with agitation until it reaches a temperature of about 125° F.

(7) The whey is then drained from the curd. At this point the pH (of the curd) will preferably be within the pH range of 4.40–4.50.

(8) The curd is rinsed with cold water at a pH of 6.00 or below, chlorinated with 10 parts per million of available chlorine. The water is allowed to remain on the curd for about fifteen minutes and then drained. Such washing is repeated a second time.

(9) After draining the last rinse water the curd is creamed and packaged. The pH of the dry curd should be 4.75 or below.

In the examples, given below, the commercial procedure outlined in Steps 1–9 above were followed using relative proportions of ingredients. The "pH when set" was a pH of the milk taken after Step 3. The "pH after 30 minutes" and "pH after 2 hours" were pH of the curd 30 and 120 minutes after Step 3. The term "no whey" under "Comments" means that the cottage cheese did not whey off or continue to extrude whey after washing (Steps 4 and 9). The "pH after heating" refers to the pH of the whey after the heating Step 6.

EXAMPLE 1

Dampered acid formula:
  90% Monsanto fine crystal fumaric acid  }Mix
  10% corn oil
pH profile at 2.0 grams/100 grams solids When set _____ 5.10
  After 30 minutes _____ 4.92
  After 2 hours _____ 4.92
Comments:
  Smooth coagulation
  No whey
pH after heating to 100° F. _____ 4.25

EXAMPLE 2

Dampered acid formula:
pH profile at 2.0 grams/100 grams solids
  90% Monsanto fine crystal fumaric acid  }Mix
  10% glyceryl mono safflower oil, 90% mono When set _____ 4.95
  After 30 minutes _____ 4.95
  After 2 hours _____ 4.92
Comments:
  Smooth coagulation
  No whey
pH after heating to 100° F. _____ 4.45

EXAMPLE 3

Dampered acid formula:
  90% Allied Chemical coarse fumaric acid  }Mix
  10% soybean oil
pH profile at 2.0 grams/100 grams solids
  When set _____ 4.92
  After 1½ hours _____ 4.65
Comments:
  Smooth coagulation
  No whey
pH after heating to 125° F. _____ 4.29

EXAMPLE 4

Dampered acid formula:
  90% Allied Chemical coarse fumaric acid  }Mix
  10% peanut oil
pH profile at 2.0 grams/100 grams solids
  When set _____ 5.00
  After 1½ hours _____ 4.55
Comments:
  Smooth coagulation
  No whey
pH after heating to 125° F. _____ 4.35

EXAMPLE 5

Dampered acid formula:
  90% Allied Chemical coarse fumaric acid  }Mix
  10% coconut oil, 90° F.
pH profile at 2.0 grams/100 grams solids
  When set _____ 4.95
  After 1½ hours _____ 4.78
Comments:
  Smooth coagulation
  No whey
pH after heating to 125° F. _____ 4.45

EXAMPLE 6

Dampered acid formula:
  90% citric acid, crystals, large, Pfizer Anhy.  }Mix
  10% glyceryl mono safflower oil, 90% mono.
pH profile at 2.0 grams/100 grams solids
  When set _____ 4.85
  After 1½ hours _____ 4.62
Comments:
  Smooth coagulation
  No whey
pH after heating to 125° F. _____ 4.40

EXAMPLE 7

Dampered acid formula:
  90% citric acid, crystals, large, Pfizer Anhy.  }Mix
  10% glyceryl mono cottonseed oil, 90% mono.
pH profile at 2.0 grams/100 grams solids
  When set _____ 4.85
  After 1½ hours _____ 4.85
Comments:
  Smooth coagulation
  No whey
pH after heating to 125° F. _____ 4.35

EXAMPLE 8

Dampered acid formula:
    90% citric acid, crystals, large, Pfizer Anhy.    ⎫
    10% Myvatex 8–20E, 72% mono (melted)    ⎬ Mix
pH profile at 1.0 gram/100 grams solids
    When set _____ 4.90
    After 1½ hours _____ 4.85
Comments:
    Smooth coagulation
    No whey
pH after heating to 125° F. _____ 4.38

EXAMPLE 9

Dampered acid formula:
    Coated citric acid
    Gentry Corporation
    Fair Lawn, New Jersey
pH profile—grams/100 grams solids

| Usage rate, gr./100 gr. | pH when set | pH after 1½ hrs. | Comments | pH after heating to 125° F. |
|---|---|---|---|---|
| 0.60 | 4.98 | 4.95 | Smooth coagulation; trace of whey. | 4.50 |
| 0.50 | 4.85 | 4.85 | do | 4.60 |
| 0.40 | 4.95 | 4.90 | do | 4.70 |
| 0.30 | 4.95 | 4.95 | Not coagulated | 4.90 |
|  | 4.99 | 4.98 |  |  |

EXAMPLE 10

Dampered acid formula:
    Coated fumaric acid
    Gentry Corporation
    Fair Lawn, New Jersey
pH profile—grams/100 grams solids

| Usage rate, gr./100 gr. | pH when set | pH after 1½ hrs. | Comments | pH after heating to 125° F. |
|---|---|---|---|---|
| 0.60 | 4.98 | 4.98 | Smooth coagulation; trace of whey. | 4.75 |
| 0.50 | 4.98 | 4.98 | do | 4.72 |
| 0.40 | 4.98 | 4.98 | do | 4.70 |
| 0.30 | 4.98 | 4.98 | do | 4.75 |
|  | 4.98 | 4.98 | Not coagulated | 4.90 |

EXAMPLE 11

Dampered acid formula:
    70% adipic acid, medium crystals _____⎫
    20% citric acid, coarse crystals _____⎬ Mix
    10% glyceryl mono cottonseed oil, 90% mono⎭
pH profile at 1.0 grams/100 grams solids
    When set _____ 4.95
    After 1½ hours _____ 4.92
Comments:
    Smooth coagulation
    No whey
pH after heating to 125° F. _____ 4.48

EXAMPLE 12

Dampered acid formula:
    50% adipic acid, medium crystals _____⎫
    40% succinic acid, large crystals _____⎬ Mix
    10% glyceryl mono safflower oil _____⎭
pH profile at 1.0 grams/100 grams solids
    When set _____ 4.95
    After 1½ hours _____ 4.92
Comments:
    Smooth coagulation
    No whey
pH after heating to 125° F. _____ 4.48

EXAMPLE 13

Dampered acid formula:
    90% adipic acid, medium crystals _____⎫
    10% corn oil _____⎬ Mix
pH profile at 3.0 grams/100 grams solids
    When set _____ 4.89
    After 1½ hours _____ 4.85

Comments:
    Smooth coagulation
    Film of whey
pH after heating to 125° F. _____ 4.38

EXAMPLE 14

Dampered acid formula:
    90% adipic acid, medium crystals _____⎫
    10% coconut oil, 76° F. _____⎬ Mix
pH profile at 3.0 grams/100 grams solids
    When set _____ 4.83
    After 1½ hours _____ 4.83
Comments:
    Smooth coagulation
    Layer of whey
pH after heating to 125° F. _____ 4.30

EXAMPLE 15

Dampered acid formula:
    90% adipic acid, medium crystals _____⎫
    10% glyceryl mono oleate, 60% mono _____⎬ Mix
pH profile at 3.0 grams/100 grams solids
    When set _____ 4.87
    After 1½ hours _____ 4.83
Comments:
    Smooth coagulation
    Film of whey
pH after heating to 125° F. _____ 4.40

EXAMPLE 16

Dampered acid formula:
    90% adipic acid, medium crystals _____⎫
    10% glyceryl mono corn oil, 90% mono ___⎬ Mix
pH profile at 3.0 grams/100 grams solids
    When set _____ 4.82
    After 1½ hours _____ 4.80
Comments:
    Smooth coagulation
    Film of whey
pH after heating to 125° F. _____ 4.38

EXAMPLE 17

Dampered acid formula:
    46% fumaric acid, fine powder _____⎫
    46% adipic acid, medium crystals _____⎬Mix
    8% glycerol mono cottonseed oil, 90% mono⎭
pH profile—grams/100 grams solids

| pH when set | pH after 1½ hr. | Grams 100 gr. solids | Comments | pH after heating to 125° F. |
|---|---|---|---|---|
| 5.05 | 4.80 | 2.0 | Smooth coag. No whey | 4.65 |
| 4.95 | 4.75 | 2.0 | do | 4.40 |
| 4.95 | 4.85 | 1.0 | do | 4.60 |

EXAMPLE 18

Dampered acid formula:
    40% fumaric acid, fine powder _____⎫
    40% adipic acid, medium crystals _____⎬Mix
    10% Corn oil _____⎭
    10% mono calcium phosphate _____ Mix.
pH profile—grams/100 grams solids

| pH when set | pH after 1½ hrs. | Grams/ 100 gr. solids | Comments | pH after heating to 125° F. |
|---|---|---|---|---|
| 4.85 | 4.62 | 2.0 | Slight protein pptn. Firm coag. and whey. | 4.52 |
| 4.95 | 4.65 | 1.0 | Smooth coagulation. Film of whey. | 4.65 |

EXAMPLE 19

Dampered acid formula:
    80% fumaric acid, fine crystals _____⎫
    10% corn oil _____⎬Mix.
    10% Mono calcium phosphate _____⎭
pH profile—grams/100 grams solids

| pH when set | pH after 1½ hrs. | Grams/ 100 gr. solids | Comments | pH after heating to 125° F. |
|---|---|---|---|---|
| 4.80 | 4.65 | 2.0 | Slight protein pptg. Firm coag. and whey. | 4.32 |
| 4.88 | 4.65 | 1.0 | Smooth coagulation. Trace of whey. | 4.56 |

EXAMPLE 20

Dampered acid formula:
- 80% fumaric acid, fine crystals } Mix
- 10% corn oil
- 10% calcium sulfate } Mix pH profile—grams/100 grams solids

| pH when set | pH after 1½ hrs. | Grams/ 100 gr. solids | Comments | pH after heating to 125° F. |
|---|---|---|---|---|
| 4.90 | 4.80 | 2.0 | Smooth coagulation; layer of whey. | 4.30 |
| 4.90 | 4.85 | 1.0 | do | 4.58 |

EXAMPLE 21

Dampered acid formula:
- 80% fumaric acid, fine crystals } Mix
- 10% Myvatex 8-20E, 70% Mono-melted } Mix
- 10% calcium sulfate pH profile—grams/100 grams solids

| pH when set | pH after 1½ hrs. | Grams/ 100 gr. solids | Comments | pH after heating to 125° F. |
|---|---|---|---|---|
| 4.80 | 4.50 | 2.0 | Smooth coagulation; layer of whey. | 4.35 |
| 4.85 | 4.75 | 1.0 | do | 4.52 |

EXAMPLE 22

Dampered acid formula:
- 40% fumaric acid, fine crystals } Mix
- 40% adipic acid, medium crystals } Mix
- 10% glyceryl mono corn oil, 90% mono } Mix
- 10% calcium sulfate pH profile—grams/100 grams solids

| pH when set | pH after 1½ hrs. | Grams/ 100 gr. solids | Comments | pH after heating to 125° F. |
|---|---|---|---|---|
| 4.88 | 4.70 | 2.0 | Smooth coagulation; trace of whey. | 4.50 |
| 4.92 | 4.82 | 1.0 | do | 4.55 |

EXAMPLE 23

Dampered acid formula:
- 80% fumaric acid, fine crystals } Mix
- 10% gylceryl mono corn oil, 90% mono } Mix
- 10% calcium sulfate pH profile—grams/100 grams solids

| pH when set | pH after 1½ hrs. | Grams/ 100 gr. solids | Comments | pH after heating to 125° F. |
|---|---|---|---|---|
| 5.02 | 4.85 | 2.0 | Smooth coagulation; film of whey. | 4.30 |
| 5.00 | 4.95 | 1.5 | do | 4.65 |
| 4.85 | 4.75 | 1.0 | do | 4.35 |

EXAMPLE 24

Dampered acid formula:
- 40% fumaric acid, fine crystals } Mix
- 5% glyceryl mono corn oil, 90% mono
- 55% calcium sulfate } Mix pH profile—2.5 grams/100 grams solids
- When set _____ 4.80
- After 1½ hours _____ 4.52

Comments:
Smooth coagulation
No whey pH after cooking to 125° F. Curd: 4.51. Whey: 4.42.

EXAMPLE 25

Dampered acid formula:
- 80% fumaric acid, Allied Chem. coarse crystals } Mix
- 12% calcium sulfate } Mix
- 8% glyceryl mono corn oil, 90% mono

| pH when set | pH after 1½ hrs. | Grams/ 100 gr. solids | pH after cooking to 125° F. Curd | Whey |
|---|---|---|---|---|
| 5.05 | 4.91 | 1.00 | 4.85 | 4.45 |
| 5.03 | 4.97 | 1.25 | 4.72 | 4.40 |
| 5.02 | 5.03 | 1.00 | 4.78 | 4.45 |

EXAMPLE 26

Dampered acid formula:
- 80% fumaric acid, monosanto fine crystals } Mix
- 12% calcium sulfate } Mix
- 8% glyceryl mono oleate, 72% mono pH profile—grams/100 grams solids
- Gram/100 grams solids _____ 1.00
- When set _____ 4.85
- After 1½ hours _____ 4.76 pH after cooking to 125° F. Curd: 4.82. Whey: 4.58.

Examples A1 through A6 illustrate the method of the present invention as it applies to the acidification of cheese curd made with direct acid acidification without refrigeration. Milk in these samples is acidified to a pH just above that at which coagulation will occur by concentrated acid additions accompanied by vigorous agitation. Dampered acids are then added along with enzyme coagulator to effect coagulation.

EXAMPLES A1–A6

No. A1

1. Skim milk at the desired setting temperature of 65°–85° F. is put under high speed agitation.
2. Add 75% $H_3PO_4$ at the point of maximum agitation, at the rate of 2.75 cc. per 100 grams of solids.
3. Add dampered acid, formula shown in Example 25, at the rate of 2.50 grams per 100 grams solid.
4. Add a 1–20 aqueous dilution of single strength rennet extract at the rate of about 8 ounces per 100 gallons of milk.
5. Continue the agitation for a few minutes until the dampered acid and enzyme solution is thoroughly dispersed in the milk.
6. Turn off the agitation and remove the agitator from the vat.
7. Allow the milk to set motionless for 30–90 minutes.
8. Then cut and cook the curd in the usual way.

No. A2

1. Skim milk at a temperature of 70° F. is agitated at high speed while 75% $H_3PO_4$ is added at the rate of 2.50 cc. per 100 grams of solids.
2. Add dampered acid formula shown in Example 1, at the rate of 3.00 grams per 100 grams.
3. Add enzyme (1–20 aqueous dilution of rennet) at the rate of about 7 ounces per 100 gallons of milk.
4. Stop agitation and remove agitator.
5. Cut the curd in 30–90 minutes.
6. Cook the curd in the usual way.

No. A3

1. Skim milk at a temperature of 65°–85° F. is agitated at high speed while 75% $H_3PO_4$ is added at the rate of 3.0 cc. per 100 grams of solids.
2. Add dampered acid formula shown in Example 2 at the rate of 2.0 grams per 100 grams solids.
3. Add coagulator solution at the rate of 10 ounces per 100 gallons.
4. Stop agitation and remove agitator.
5. Cut the curd in 30 minutes.
6. Cook the curd in the usual way.

No. A4

1. With the skim milk in the cheese vat at a temperature of 90° F. and agitator on high, add dampered acid formula of Example 25, at the rate of 5 grams per 100 grams solids.
2. Add single strength rennet at the rate of 15 cc. per 100 gallons of milk.
3. Agitate for another 10 minutes, then shut off agitation.
4. Cut the curd in 30 minutes.
5. Cook the curd in the usual way.

No. A5

1. Have the milk in a cheese vat at a temperature of 70° F. and the agitator on high speed, add dampered acid formula of Example 1 at the rate of 6.0 grams per 100 grams solids.

2. Add a 1–20 dilution of single strength rennet at the rate of 10 ounces per 100 gallons.
3. Continue agitation for another 10 minutes.
4. Stop agitation and remove agitator.
5. Cut the curd in 60 minutes, and cook in the usual way.

No. A6

1. With the milk at a temperature of 65°–85° F., turn the agitator on high speed.
2. Add dampered acid formula of Example 2 at the rate of 5.0 grams per 100 grams solids.
3. Add cottage cheese coagulator at the rate of 7 ounces per 100 gallons.
4. Continue agitating for another 10 minutes, then stop the agitation and remove agitators.
5. Cut the curd in 90 minutes.
6. Add 75% $H_3PO_4$ at the rate of 0.5 cc. per 100 grams solids. Stream acid slowly around sides of the vat.
7. Cook the curd in the usual way.

In the preparation of the dampered low solubility acids (fumaric, adipic, and succinic) it was initially found that an acid with the particle size in the range of 98 percent minus 50 mesh and 98 percent plus 100 mesh gave the best results in dampering. In the embodiment of our principle of coating the acid particles, it is essential that the coated acid in its final form consist of individual particles. As the particles are coated, and the coating becomes a continuous film around each of the granules in the process of mixing and stirring while the coated material is in a liquid state, there is only a slight tendency for the particles to lump together in aggregates. The reason for this is that apparently the thin film coating the particle is not strong enough to offset the weight of the particles tending to cleave, or separate, as the material is agitated. However, the coating material is a solid at room temperature and, as the coating begins to solidify, the strength of this coating film increases enormously, and it then has enough strength to glue two or more particles together into aggregates. The size of the particles and the adhesive characteristics of the coating material are selected so that, by keeping the mass in constant slow motion while the coating material is in the process of solidifying, the particles very effectively break apart and the coating solidifies as a continuous film around each individual particle. Furthermore, the nature of the coating is such that after it is solidified, it is hard and non-tacky, so that the coated acid granules are relatively free flowing, with little or no tendency to agglomerate or cake together during long periods of storage or in transit.

In the utilization of fumaric acid, we find that the dampering characteristics are just about ideal and the acid release is perfect for our application in cottage cheese. However, due to the comparatively large size of the coated low solubility acid particles, and their greater density than the milk in which they are dispersed, there is a tendency for many of the particles to settle to the bottom of the vat before coagulation takes place. When this happens, the milk is not properly acidified because some of the acid failed to remain in and become entrapped in the coagulated milk. The fact that the acid settling on the bottom is wasted is undesirable, of course, but a greater problem is the fact that the milk curd does not retain the desired amount of the acid particles to effect complete acidification of the milk curd as the cheese is heated and the acid is released.

Many attempts have been made to counteract the tendency of the acid particles to settle to the bottom. One method we found was to adjust the amount of enzyme so that the milk coagulated in less than one hour (preferably about 15 minutes), thereby minimizing the time in which the acid particles are suspended in fluid milk and are in a solution where they can settle to the bottom. This procedure is not entirely effective because the milk has to be brought to a completely quiescent state after all the ingredients have been added before coagulation sets in. Otherwise the coagulation will be weak, grainy and unfit for making cottage cheese. In commercial applications, with large bodies of milk, such as 1–3 thousand gallons in large cheese vats, the milk does not come to a quiescent state immediately after agitation has stopped and the agitators have been removed from the vat. Instead, the milk has a tendency to flow back and forth in the vat for several minutes after agitation has ceased. For this reason, it is necessary to allow the milk to stand (preferably about 15 minutes) at least from the time agitation has stopped before the milk will actually reach a quiescent state.

Attempts to damper a fine powdered fumaric acid (i.e., less than 100 mesh), we find that it is very easy to coat the powdered particles so that their solution in water is effectively retarded or delayed, but we had never been able to coat such a fine particle fumaric acid and bring it back to the same particle size after the coating has solidified. Invariably the coating glues numerous particles together so that instead of winding up with a free-flowing, fine powder, the final product is one solid mass, or else composed of various sized granules which are agglomerates of many particles glued together.

I have tried milling this final product to bring it back to its original particle size, but the friction of the milling melts or softens the coating so that the product balls up and invariably chokes up the milling equipment, thereby making milling impossible.

In the course of this work I discovered that after the particles have been coated with a suitable melted fatty material, then a dry powder can be incorporated while the product is being agitated and by incorporating from about 6 to 40 percent of the coated acid powder by weight, (preferably about 25 percent) and continuing the mixing until the coating material has solidified, a final product is obtained which is dry, non-tacky, and free flowing, and which is largely in individual particles like the acid powder at the start of the process. If the incorporation of the dry powder and the mixing is handled properly, it is possible to wind up with a powder that is virtually free of any lumps at all. By employing the amorphous powders, I find that it is possible to coat fine (98 percent through a 100 mesh screen but 98 percent retained on a 200 mesh screen) as well as coarse particles. In fact, I find that it is possible to coat particles of the low solubility acids, particularly furamic, where all of the powder will pass through a 100 mesh screen and up to 40 percent of the particles will pass through a 200 mesh screen.

Also, I discovered that even where there are some lumps in the final products, they can be screened out without adversely affecting the performance of the powder. This final product, it has been discovered, is coated with such a uniform and stable coating that the product can be milled to break up these few granules without in any way damaging the coating on the particles. As a routine procedure, we take the finished powder, either immediately after it has been made or after it has been stored for several days, and mill it for example through a "hammer mill." Under these conditions, there is very little tendency of the coated fumaric acid to ball up or clog the screen of the hammer mill, and the milled product is in the form of individual particles of coated fumaric acid, very similar to the starting material in size.

When this coated, fine low solubility (fumaric, adipic, succinic) acid power is used as the secondary or curd acidifying material in our cottage cheese application, I find that there is only a very slight tendency for the powder to settle and that the coated acid remains uniformly dispersed throughout the milk and brought about a uniform and satisfactory reduction in the pH of the cottage cheese curd.

The amorphous powder can be any substance that is nonreactive with the acid and fat and which is not deleterious to the acidified product but which is of a particle size that is within the same range as the powdered acid. This addition performs its function best by providing a large surface area to the mixture and consequently will preferably be of a particle size that is less than that of the acid powder.

Examples of satisfactory amorphous powder include flour (potato, wheat, tapioca, rice and like substances), starch, skim milk powder, nonfat milk solids, caseinate, powdered sugar, powdered vegetable gums (such as locust bean gum, guar gum, carageenan, etc.) and gelatin. The aforementioned list of materials are preferable since they are edible and common additions to milk and dairy products. However, other amorphous materials not ordinarily considered to be edible but which are not reactive with the acid and are not deleterious to the milk and which may be consumed include such materials as diatomaceous earth, Fullers earth, silicates, alkali metal phosphates, pumas and $SiO_2$ powder.

Such amorphous powders may be utilized in amounts ranging from about 6 to 40 percent by weight of the acid-fat mixture depending on and preferably proportional to the amount of fatty material employed. The preferred and most usual application of these materials will be from about 20 percent to 30 percent by weight.

Any coating of the acid particles with a fat retards its solubility to some extent so that the amount of coating is not critical. However, I have had particular success in utilizing additions of as little as 3 percent, by weight of the dry acid powder of a coating fat (i.e., oils, fats, fatty acids and glycerides of fatty acids), to powdered acids to effect dampering or slow release that is adequate for cottage cheese applications and that as much as 25 percent, by weight of the dry acid powder of such coating fat can be successfully employed. The ideal fat additions for producing cottage cheese are within the range of about 5 to 15 percent, by weight of the dry acid powder. I have had considerable success in utilizing about 10 percent, by weight, fat additions to powdered acids for making cottage cheese in accordance with the above described direct acid process.

In dampering acid powders in accordance with the method of my invention it is desirable to add the coating fat to the dry acid powder while in a melted or fluid condition and then thoroughly blend this mixture with relatively large amounts of fine inert (to the acidified milk product) amorphous powder. Such an amorphous powder maintains the acid powder in a free flowing condition upon cooling. It is my theory that tiny segments of a fatty film attach to each particle gluing them together and causing agglomeration in the absence of the amorphous powder and thus loss of the free flowing characteristics of the powder. It is my opinion that the amorphous powder sticks to the segment of fatty film on each particle and prevents the particles from adhering to each other and agglomerating. By this method the treated acid powder becomes free-flowing upon cooling and yet retains its powdery characteristics that are essential to distribution in the liquid milk and prevent its premature settling.

The particle size of the coated or dampered acid particles is difficult to accurately ascertain since even where the acid particle is combined with an amorphous powder, some agglomeration takes place. However, where the amorphous powders are included and the acid powders are of the preferred particle size (substantially all will pass through a 100 mesh screen) substantially all of the coated acid-amorphous powder mixture will pass through a 50 mesh screen.

In the utilization of coating materials in conjunction with the process of the present invention it is generally convenient to employ a liquid coating material that will solidify on the particles. Thus, when using a fat or fat-like material as the coating or additive, the coating material must melt to be a liquid at a temperature that may be reasonably employed for coating but which will be a solid at temperatures where the acids are handled, stored and used as an additive to milk. Thus, in most instances the coating fat or oil must melt or be a liquid at a temperature above ambient but must be a solid at ambient temperatures. In this manner liquid fat or fatty-like materials may be added to the acid granules or powder to coat the powder but will solidify upon cooling to encapsulate or damper. For example, I may select a monodiglyceride having a melting point of about 140° F. to treat fumaric acid powders so that the powders may be mixed with the liquid glyceride and while the glyceride is in a liquid state (140° F. or above) and will solidify to coat the individual acid crystals or granules. In a similar manner where the acid is powdered (100 mesh or finer) it is advantageous to utilize a fat or fatty-like coating material that will melt at some convenient temperature above ambient so that it can be mixed with the acid powder and amorphous powder prior to solidification (although obviously it cannot encapsulate all the powder particles).

The addition of acids to skim milk to lower the pH to 4.85 to 5.20 prior to coagulation with an enzyme is not a critical step in the present process since the direct acid additions do not themselves produce a curd and the present invention as it relates to this embodiment is a method of providing in situ acidification within the formed curd rather than the acidification of milk to below the isoelectric point of the milk. Thus, the quality of the curd is not a controlling factor in the present process and weak acids as well as strong acids may be employed. Generally, however, the acids employed will constitute 10 percent or less by weight, of the milk base being treated. We generally employ an acid addition that constitutes 5 percent, or less, by weight, of the skim milk. Such acid additions may consist of from about 0.3 to 0.5 part by weight of true acid per 100 parts by weight of milk.

The amount of proteolytic enzyme employed to effect coagulation is not critical and may vary considerably from batch to batch. The coagulation of acidified milk by enzyme addition is very old and well within the skill of the art. Should any given quantity fail to effect curd formation, additional amounts may be employed. Attempts to standardize enzymes is described in U.S. Pat. 3,406,076. Generally standard strength Rennett additions (such as Hansen's liquid single-strength Rennett) at ambient temperatures (60° F. to 80° F.) of from about 1 to 10 cc. per 1000 pounds of milk are adequate; however, standard Rennett additions of from ½ to 100 cc. per 1000 pounds of milk may be employed. In the examples of the present specification I employ cottage cheese coagulator which is a very dilute coagulator amounting to only about one-twentieth of the strength of Hansen's standard coagulator.

Although my invention is particularly useful when used in the manufacture of cottage cheese, it is also applicable to other forms of cheese products wherein casein is coagulated to form a high textured gelled curd. For example, Bakers' cheese and buttermilk may be readily made by the method of the present invention.

For the purposes of this specification and the claims the terms fat or fatty-like shall mean all oils and fats, glycerides of fatty acids, fatty acids, and like materials (such as those described and set forth in the specification) which have a sufficiently defined melting point (which may be over a range of temperatures) that they can be rendered liquid at a temperature higher than that at which they are to be used (usually above ambient) and solid at temperatures at which they are to be used or handled (usually below ambient).

Such a coating may be selected so that it is a solid at the temperature of the milk when the particles are dispersed in the milk to be trapped in the curd by subsequent coagulation but a liquid at the temperature at which the curd is cooked. Thus, the acid particles are restrained from dissolving and releasing their acid content until they are entrapped by the curd, then during cooking the coating will melt and acid is released, in situ, in the curd to materially enhance its quality and shelf-life characteristics. In the production of cottage cheese the coating would ideally have a melting temperature above about 70° F. since the acids are added at temperatures of 50°–70° but below 150° F. (the highest temperature at which it might be cooked).

The amount or quantity of coated acid utilized or distributed to acidify the curd is, of course, not critical since any amount will lower the pH of the curd which is the desired effect. Generally, the coated acid particles will be added in amounts to lower the pH of the curd to below 4.85. It will seldom be desirable to lower the pH of the curd to below about 4.5. In terms of total coated acid-amorphous powder mixture, generally from about 1.1 to 4.4 parts, by weight, per 100 parts, by weight, of the solids content of the milk is employed. Since skim milk contains about 9 percent, by weight, solids such addition would amount to from about .1 to .4 part, by weight, of the milk.

In view of the above, my best mode of procedure in making cottage cheese curd is as follows:

(1) Skim milk is brought to a temperature of about 40° F. (32° F. to 50° F.);
(2) The milk is acidified by direct acid additions to a pH of about 5.0 (pH 4.85 to 5.2, the acid preferably does not amount to more than about 10 percent, by weight, of the milk);
(3) Warm the milk to about 70° F. (60° F. to 80° F.);
(4) Disperse a mixture of low solubility acid powder (fumaric, succinic, or adipic) and amorphous powder (at least 98 percent of the acid powder passing through a 50 mesh screen). Preferably the acid powder will be below about 100 mesh in size. The amorphous powder should be of a smaller particle size than the acid granules or crystals. The mixture is added in amounts that will lower the pH of the resulting curd to below 4.85 (usually in amounts from about 1.1 to 1.4 parts per 100 parts of milk solids) while agitating the milk;
(5) Add cottage cheese coagulator or other proteolytic enzyme in amounts to set the milk (usually about ½ to 10 cc. of Hansen's Standard Rennett, Extract per 1,000 pounds of milk or its equivalent in cottage cheese coagulator or other enzyme);
(6) Discontinue all agitation until the milk becomes quiescent and sets (usually 1½ hours but optionally ½ to 4 hours);
(7) Cut the curd into cottage cheese cubes;
(8) Optionally allow the curd and whey to set undisturbed for about 15 minutes (1 minute to 1 hour would be satisfactory) and then start heating, preferably stirring about every 5 minutes (the agitator may normally be turned on at about 80° F.–85° F.);
(10) Continue heating to cooking temperature;
(11) Cook to about 125° F. (100° F.–150° F.); and
(12) Drain the whey and rinse at least once in cold chlorinated water. Then draw off the rinse water, cream (optional) and package.

Examples B1 through B5 illustrate the preferred embodiment of the present invention as it applies to the preparation of dampered acid powders and acidification of milk or cream in the production of cottage cheese, Bakers' cheese, yogurt and buttermilk.

EXAMPLE NO. B1—COTTAGE CHEESE

| Ingredient: | Pounds |
|---|---|
| Myvatex 8–20E [1] | 7 |
| Stearic acid [2] | 3 |

Melt and heat to 170° F. or above.

| Ingredient: | Pounds |
|---|---|
| Add: | |
| Pfizer fumaric acid powder (100 mesh) [3] | 65 |

Continue heating, and mix thoroughly. Stop heating and continue to mix.

Add:
Powdered corn starch _____ 10

Mix thoroughly. Start cooling batch.

Add:
Powdered corn starch _____ 10

Mix slowly to break up lumps.

Add:
Powdered corn starch _____ 5

Mix slowly to break up lumps and continue mixing until cool.

Total _____ 100

[1] Myvatex 8–20E—A product of Eastman Chemical Products, Inc. It is a blend of 80% distilled monoglycerides (minimum 90% mono) plus 20% triglycerides.
Eastman Specifications are:
Saponification No. 165
Iodine value, 25
monoester content, 75% (minimum)
F.F.A. (as stearic), 1.5% (maximum)
Glycerol content, 1% (maximum)
Eastman does not state the melting point of this product. By our determination, it is 125–130° F.
[2] Stearic acid—Food grade stearic acid is used. It has a melting point of 156–158° F.
[3] 99% minimum will pass through a 100 mesh screen (at least 30% will pass through a 200 mesh screen). Made by Pfizer, Inc. of New York, N.Y.

Remove powder from mixer and mill through hammer mill with a screen of about 0.050 inch, so as to reduce the product to a fine, free-flowing powder, free of lumps.

Use the above dampered fumaric acid in cottage cheese as follows:

To 475 gallons of skim milk (at a temperature of 40° F.), add 6,000 cc. of 75% phosphoric acid (usage rate, 3.6 cc. per 100 grams of solids). Agitate the milk vigorously while the phosphoric acid is being added, and stream the acid in slowly at the point of maximum agitation. Continue mixing after the acid is added, and warm the milk to a temperature of 70° F.

| Weigh out: | G. |
|---|---|
| Dampered fumaric acid (just made) (usage rate—2 grams per 100 grams milk solids) | 3360 |
| Sodium acid pyrophosphate powder (SAPP No. 4 made by Stauffer Chemical Co.) (usage rate, 0.2 gram per 100 grams milk solids) | 336 |
| Total | 3696 |

Mix the above and disperse in 1½ times its weight of cold tap water.

With the cheese milk at a temperature of 70° F. and the agitator on high speed, add 1280 cc. of Hansen's Cottage Cheese Coagulator (usage rate, 270 cc. per 100 gallons of milk) and the slurry of dampered fumaric acid. Continue agitation for 5–10 minutes to assure thorough mixing.

Stop agitation and remove agitator from the milk. Allow the milk to set undisturbed for 30–90 minutes, until a firm coagulation has formed.

Cut the coagulated milk into cubes with ¼ inch cheese knives, and allow to set for 15 minutes. Then fill the jacket with warm water and start heating slowly. Stir the cheese very carefully. Continue heating until the desired cooking temperature is reached.

Drain off the whey and replace with ic water. Discard the rinse water and replace with a second ice water rinse. Draw off the last rinse, and allow the cheese to drain until water stops draining from the curd.

Weigh the curd and take a sample for analysis.

SUMMARY.—Batch No. G-33

Skim milk
Pasteurizing temperature: 162° F.
Batch size:
    475 gallons
    4,100 pounds
Percent solids: 9.03; pounds: 362
Temperature of milk-acid: 40° F.
Time set: 11:30
Temperature of milk: 70° F.
Temperature of water: 70° F.
Temperature—cut: 70° F.
Hours set: 1½
Knives: ¼×¼″
Yield at 20% solids: 19.5%
Lbs./lb. solids: 2.16
Acidity:
    Before set: pH, 5.02; percent, 0.87
    Milk set: pH, 4.92; percent, 0.92
    Curd cut: 4.92
    Final whey: pH, 4.27; percent, 0.86
Rinse water:
    1st: 38° F.
    2d: 36° F.
Cooking:

| Time | Temperature, °F. | | Acidity | |
|---|---|---|---|---|
| | Water | Whey | pH | Percent |
| 1:00 cut | | | 4.92 | |
| 1:15 heat on—stir | | | 4.70 | 0.78 |
| 1:30 | 118 | 92 | 4.35 | 0.82 |
| 1:45 | 124 | 110 | 4.18 | 0.84 |
| 2:00 | 135 | 120 | 4.22 | 0.85 |
| 2:15 | 135 | 125 | 4.27 | 0.86 |
| Drain | | | | |

Percent curd solids: 20.5
Curd weight: 782 lbs.
pH of curd: 4.53

EXAMPLE NO. B2—COTTAGE CHEESE

| Ingredient: | Pounds |
|---|---|
| Myvatex 8-20E | 7 |
| Stearic acid | 3 |

Melt and heat to 170° F. or above.
Add:
    Pfizer fumaric acid powder (100 mesh) _____ 65
    Continue heating, and mix thoroughly. Stop heating and continue to mix.
Add:
    Nonfat dry milk _____ 10
    Mix thoroughly. Start cooling batch.
Add:
    Nonfat dry milk _____ 10
    Mix slowly to break up lumps.
Add:
    Nonfat dry milk _____ 5
    Mix slowly to break up lumps and continue mixing until cool.

Total _____ 100

Remove powder from mixer. Either mill as with Example No. B1, or screen through a 10–20 mesh sieve to remove any lumps remaining in the product.

Use the above dampered fumaric acid in cottage cheese as follows:

To 488 gallons of skim milk (at a temperature of 40° F.) add 5100 cc. of 75% phosphoric acid (usage rate, 3.00 cc. per 100 grams solids). Agitate the milk vigorously while the phosphoric acid is being added, and stream the acid in slowly at the point of maximum agitation. Continue mixing after the acid is added, and warm the milk to 70° F.

Weigh out: 4250 grams of dampered fumaric acid of Example No. B2 (usage rate, 2.5 grams/100 grams milk solids). Disperse in 1½ times its weight of cold tap water.

With the cheese milk at a temperature of 70° F. and the agitator on high speed, add 1320 cc. of Hansen's Cottage Cheese Coagulator (usage rate, 270 cc. per 100 gallons of milk) and the slurry of dampered fumaric acid. Continue the agitation for 5–10 minutes to assure thorough mixing.

Stop agitation, and remove agitator from milk. Allow the milk to set undisturbed for 60–90 minutes, until a firm coagulation has formed.

Cut the coagulated milk into cubes with ½ inch cheese knives, and allow to set for 15 minutes. Then, fill the jacket with warm water and start heating slowly. Stir the cheese very carefully. Continue heating until the desired cooking temperature is reached.

Drain the whey and wash and cool the curd as in Example No. B1.

SUMMARY.—Batch No. G-50

Skim milk
Pasteurizing temperature: 162° F.
Batch size:
    488 gallons
    4,200 pounds
Percent solids: 8.96; pounds: 376
Temperature of milk-acid: 40° F.
Time set: 11:30
Temperature of milk: 70° F.
Temperature of water: 70° F.
Temperature—cut: 70° F.
Hours set: 1½
Knives: ½×½″
Lbs./lb solids: 1.96
Yield at 20% solids: 17.7
Acidity:
    Before set: pH 5.23; percent 0.76
    Milk set: pH 5.10; percent 0.82
    Curd cut: 5.08
    Final whey: pH 4.18; percent 0.81
Rinse water:
    1st: 40° F.
    2nd: 38° F.
Cooking:

| Time | Temperature, °F. | | Acidity | |
|---|---|---|---|---|
| | Water | Whey | pH | Percent |
| 1:00 cut | | | 5.08 | |
| 1:15 heat on—stir | | | 4.80 | 0.70 |
| 1:30 | 108 | 92 | 4.30 | 0.80 |
| 1:45 | 132 | 116 | 4.12 | 0.82 |
| 2:00 | 138 | 128 | 4.18 | 0.81 |
| Drain | | | | |

Percent curd solids: 20.2
Curd weight: 735 lbs.
pH of curd: 4.65

EXAMPLE NO. B3—BAKERS CHEESE

| Ingredient: | Pounds |
|---|---|
| Myvatex 8-20E | 8 |
| Myverol 18:00 (distilled glyceryl monostearate minimum 90% mono. melting point 163° F.) | 2 |

Melt and heat to 180° F. or above.
Add:
    Pfizer fumaric acid powder (100 mesh) _____ 65
    Continue heating and mix thoroughly. Stop heating and continue to mix.
Add:
    Nonfat dry milk _____ 10
    Mix thoroughly. Start cooling batch.
Add:
    Nonfat dry milk _____ 10
    Mix slowly to break up lumps.
Add:
    Nonfat dry milk _____ 5
    Mix slowly to break up lumps, and continue mixing until cool.

Total _____ 100

Mill product to break up lumps. Use in bakers cheese as follows:

To 500 gallons of skim milk (at a temperature of 40° F.) add 6300 cc. of 75% phosphoric acid (usage rate, 3.6 cc. per 100 grams solids).

Warm the milk to 70° F. (pH at 70° F.—5.10).

Weigh out: 3500 grams of the dampered fumaric acid of Example No. B3. Dispense in 1½ times its weight of cold tap water. With the cheese milk at 70° F. and the agitator on high speed.

Add: 75 cc. of rennet, diluted in water about 10:1 (usage rate is 15 cc. per 100 gallons of milk), and the slurry of dampered fumaric acid.

Continue agitation for 5–10 minutes. Then stop agitation and remove agitators. Allow the milk to set undisturbed for 1–2 hours, until a firm coagulum is formed. The pH should be 4.50–4.60.

Start agitator and break the curd. Separate curd and excess whey by drawing off the milk in cloth bags, or send the milk to the mechanical curd concentrator..

EXAMPLE NO. B4—YOGURT

| Ingredient: | Pounds |
|---|---|
| Conventional glyceryl monostearate (40–42% mono. M.P. about 136° F. | 10 |
| Melt and heat to 160° F. or above. | |
| Add: | |
| Pfizer fumaric acid powder (100 mesh) | 65 |
| Continue heating and mix thoroughly. Stop heating and continue to mix. | |
| Add: | |
| Guar gum | 10 |
| Mix thoroughly. Start cooling batch. | |
| Add: | |
| Nonfat dry milk | 10 |
| Mix slowly to break up lumps. | |
| Add: | |
| Nonfat dry milk | 5 |
| Mix slowly to break up lumps, and continue mixing until cool. | |
| Total | 100 |

Remove dampered fumaric acid from mixer and mill to break up lumps, or sift to remove them.

To milk containing 1–2% butterfat, add the following:

2.00% nonfat dry milk
0.10% tetrasodium pyrophosphate, anhydrous
0.20% guar gum
0.15% agar agar (finely ground)

Add the above to the milk, pasteurize in the usual way. Cool to 40°–45° F. Add acid-flavor solution to the agitated milk, sufficient to reduce the pH to 4.8–4.9, and continue the agitation.

Add 0.20% dampered fumaric acid of Example B4, dispersed in 1½ times its weight of cold tap water. Agitate the milk thoroughly and package in consumer containers and store under refrigeration. It will require about 12–18 hours for the dampered fumaric acid to all release at this temperature. The final pH of the product will be 4.30–4.50.

If desired, fruit flavors may be deposited in the bottom of the package before being filled with the yogurt.

EXAMPLE NO. B5—BUTTERMILK

| Ingredient: | Pounds |
|---|---|
| Myvatex 8–20E | 10 |
| Melt and heat to 150° F. or above. | |
| Add: | |
| Pfizer fumaric acid powder (100 mesh) | 65 |
| Continue heating and mix thoroughly. Stop heating and continue to mix. | |
| Add: | |
| Guar gum | 10 |
| Mix thoroughly. Start cooling batch. | |
| Add: | |
| Guar gum | 10 |
| Mix slowly to break up lumps. | |
| Add: | |
| Guar gum | 5 |
| Mix slowly to break up lumps, and continue mixing until cool. | |
| Total | 100 |

Remove damper fumaric acid from mixer and mill through a hammermill with 0.050 inch screen, or its equivalent.

Add to skim milk:

0.20% guar gum
0.15% salt
0.15% agar agar (finely ground)

Pasteurize at 185° F. or above for at least 3 minutes. Cool to 40° F. Acidify with acid-flavor solution to a pH of 4.80–4.90.

Add 0.20% dampered fumaric acid of Example B5, dispersed in 1½ times its weight of cold tap water.

Mix thoroughly with milk.

Stop agitation and allow milk to set undisturbed for 2–3 hours. During this time the dampered fumaric acid should be about 75% released, and the pH of the milk should be about 4.4–4.5, and a firm coagulation will be formed. Break the coagulation and agitate thoroughly.

Package and store under refrigeration.

I claim:

1. In the method of making cheese cured from milk wherein milk is caused to coagulate by the addition of a proteolytic enzyme to form a curd, the improvement in combination therewith of;
   (a) coating solid acid particles, said particles being of a particle size wherein essentially all will pass through a 100 mesh screen and being of at least one acid selected from the group consisting of fumaric, adipic, and succinic acids with at least one coating material selected from the group consisting of oils, fats, fatty acids having a chain length of 10 carbon atoms or more, and glycerides of fatty acids having a chain length of 10 carbon atoms or more;
   (b) dispersing said coated particles in said milk prior to its coagulation;
   (c) coagulating said milk prior to complete dissolution or dispersion of said coating so that a substantial portion of said coated particles will be entrapped by said curd and produce acid in situ within said curd.

2. The method of claim 1 wherein said solid acid particles consist essentially of fumaric acid.

3. The method of claim 2 wherein said fumaric acid powder is about 200 mesh size.

4. The method of claim 1 wherein said milk has a pH of from about 4.85 to 5.20 at the time it is coagulated.

5. The method of claim 4 wherein said coating material amounts to about 8 to 10 percent, by weight, of the acid particles.

6. The method of claim 1 wherein at least 98 percent of said acid particles will pass through a 100 mesh screen.

7. The method of claim 6 wherein said particulate solid acid dispersed in milk in accordance with subparagraph (b) includes from about 3 to 25 percent, by weight, of the acid of said coating material.

8. The method of claim 7 wherein said solid acid particles dispersed in milk in accordance with subparagraph (b) are introduced into said milk in the form of an addition that includes from about 6 to 40 percent, by weight of the acid and coating of an inert amorphous powder.

9. The method of claim 8 wherein said amorphous powder will all pass through a 100 mesh screen.

10. The method of claim 6 wherein said particulate solid acid dispersed in milk in accordance with subparagraph (b) includes from about 5 to 15 percent, by weight, of the acid of said coating material.

11. The method of claim 10 wherein said particulate solid coated acid dispersed in milk in accordance with subparagraph (b) includes also from about 20 to 30 percent, by weight, of the acid and coating of an inert amorphous powder.

12. The method of claim 1 wherein said acid particles consist essentially of fumaric acid particles which are added to and dispersed within said milk in the form of an addition that includes from about 5 to 15 percent, by weight of the acid, of said coating material and from 20 to 30 percent, by weight of the acid and coating, of an inert amorphous powder that will pass through a 100 mesh screen.

13. The method of claim 8 wherein said amorphous powder consists of at least one material selected from the group consisting of flour, starch, skim milk powder, nonfat milk solids, caseinate, powdered sugar, powdered vegetable gums, gelatin, diatomaceous earth, fuller's earth, silicates, alkali metal phosphates, pumice, and $SiO_2$ powder.

14. The method of claim 10 wherein said coating material has a melting temperature that is above 80° F. but below about 150° F.

15. The method of claim 8 wherein substantially all of the coated acid-amorphous powder mixture will pass through a 50 mesh screen.

16. A method for making cottage cheese curd from milk comprising:
 (a) acidifying liquid milk at a temperature below about 50° F. by making direct acid additions until the pH is within the range of from about 4.85 to 5.20;
 (b) warming said milk to from about 50° F. to 80° F. and while within said temperature range, dispersing particulate solid coated acid particles within said milk, said acid particles being of at least one acid selected from the group consisting of fumaric, adipic, and succinic acids, at least 98 percent of said acid particles being of a size that will pass through a 100 mesh screen, said coating being of a material selected from the group consisting of oils, fats, fatty acids having a chain length of 10 carbon atoms or more and glycerides of fatty acids having a chain length of 10 carbon atoms or more and setting said milk while in a quiescent state with a proteolytic enzyme so that a substantial portion of said acid particles are entrapped within said curd to effect in situ delayed acidification of the curd, said acid particles being added in an amount to provide the curd with a pH of about 4.75 or below, and;
 (c) cutting the curd into cottage cheese cubes and cooking at a temperature of from about 100° F. to 150° F.

17. The method of claim 16 wherein said acid particles consist essentially of fumaric acid particles.

18. The method of claim 17 wherein said acid powder is about 200 mesh size.

19. The method of claim 18 wherein said coating constitutes from about 8 to 10 percnt, by weight, of the acid addition.

20. The method of claim 16 wherein at least 98 percent of said acid particles will pass through a 100 mesh screen but at least 98 percent will be retained on a 200 mesh screen.

21. The method of claim 16 wherein said acid of subparagraph (a) is in the form of an additive that comprises a mixture of coated acid particles and inert amorphous powder, said mixture including acid particles which will provide the curd with a pH of about 4.75.

22. The method of claim 21 wherein said acid particles consist essentially of fumaric acid particles.

23. A method for making cottage cheese curd from milk comprising:
 (a) skim milk is brought to a temperature of from about 32° F. to 50° F.;
 (b) the milk is acidified by direct acid additions to a pH of from about 4.85 to 5.2;
 (c) the milk is warmed to from about 60° F. to 80° F.;
 (d) an additive is dispersed in said milk that consists essentially of a mixture of fumaric acid powder and inert amorphous powder, said additive including fumaric acid powder essentially all of which will pass through a 100 mesh screen in an amount that will lower the pH of the resulting curd to below 4.85, said acid powder being coated with at least one material selected from the group consisting of oils, fats, fatty acids having a chain length of 10 carbon atoms or more, and glycerides of fatty acids having a chain length of 10 carbon atoms or more, said coating material being present within the range of about 5 to 15 percent of the acid powder, and said amorphous powder being of a smaller particle size than the acid granules and being present in an amount within the range of from about 6 to 40 percent of the acid and coating;
 (e) proteolytic enzymes are added in amounts to set the milk and equivalent to about ½ to 10 cc. of Hansen's Standard Rennet Extract per 1,000 pounds of milk,
 (f) the milk is allowed to become quiescent when set for from about ½ to 4 hours so as to form curd and whey;
 (g) the cured is then cut into cottage cheese cubes;
 (h) the cubed curd and whey is then heated to temperatures of from about 100° F. to 150° F. and cooked;
 (i) the whey is drawn off the curd and the curd is washed at least once in cold chlorinated water; and
 (j) the curd is creamed and packaged.

24. An additive for milk that consists essentially of a mixture of:
 (a) acid powder essentially all of which will pass through a 100 mesh screen and up to 40 percent of which will pass through a 200 mesh screen said particles being at least one acid selected from the group consisting of fumaric, adipic, and succinic acids;
 (b) from about 3 percent to 25 percent, by weight, of the acid powders, of at least one coating material selected from the group consisting of solid oils, fats, fatty acids having a chain length of 10 carbon atoms or more and glycerides of fatty acids having a chain length of 10 carbon atoms or more in the form of a coating on the acid particles; and
 (c) from about 6 to 40 percent, by weight of the acid and coating, of an inert amorphous powder substantially all of which will pass through a 100 mesh screen.

25. The additive of claim 24 wherein said coating material is present within the range of about 5 to 15 percent of the acid powder and said inert amorphous powder is present within the range of about 20 to 30 percent, by weight of the acid and coating.

26. The additive of claim 25 wherein said amorphous powder is at least one material selected from the group consisting of flour, starch, skim milk powder, nonfat milk solids, caseinate, powdered sugar, powdered vegetable gums, gelatin, diatomaceous earth, fuller's earth, silicates, alkali metal phosphates, pumice, and $SiO_2$ powder.

References Cited
UNITED STATES PATENTS

| | | | |
|---|---|---|---|
| 980,936 | 1/1911 | Federer | 99—95 |
| 1,264,592 | 4/1918 | Atkinson | 99—95 |
| 3,131,068 | 4/1964 | Greif et al. | 99—139 |

DAVID M. NAFF, Primary Examiner

U.S. Cl. X.R.

426—361, 39, 99